United States Patent Office 2,869,281
Patented Jan. 20, 1959

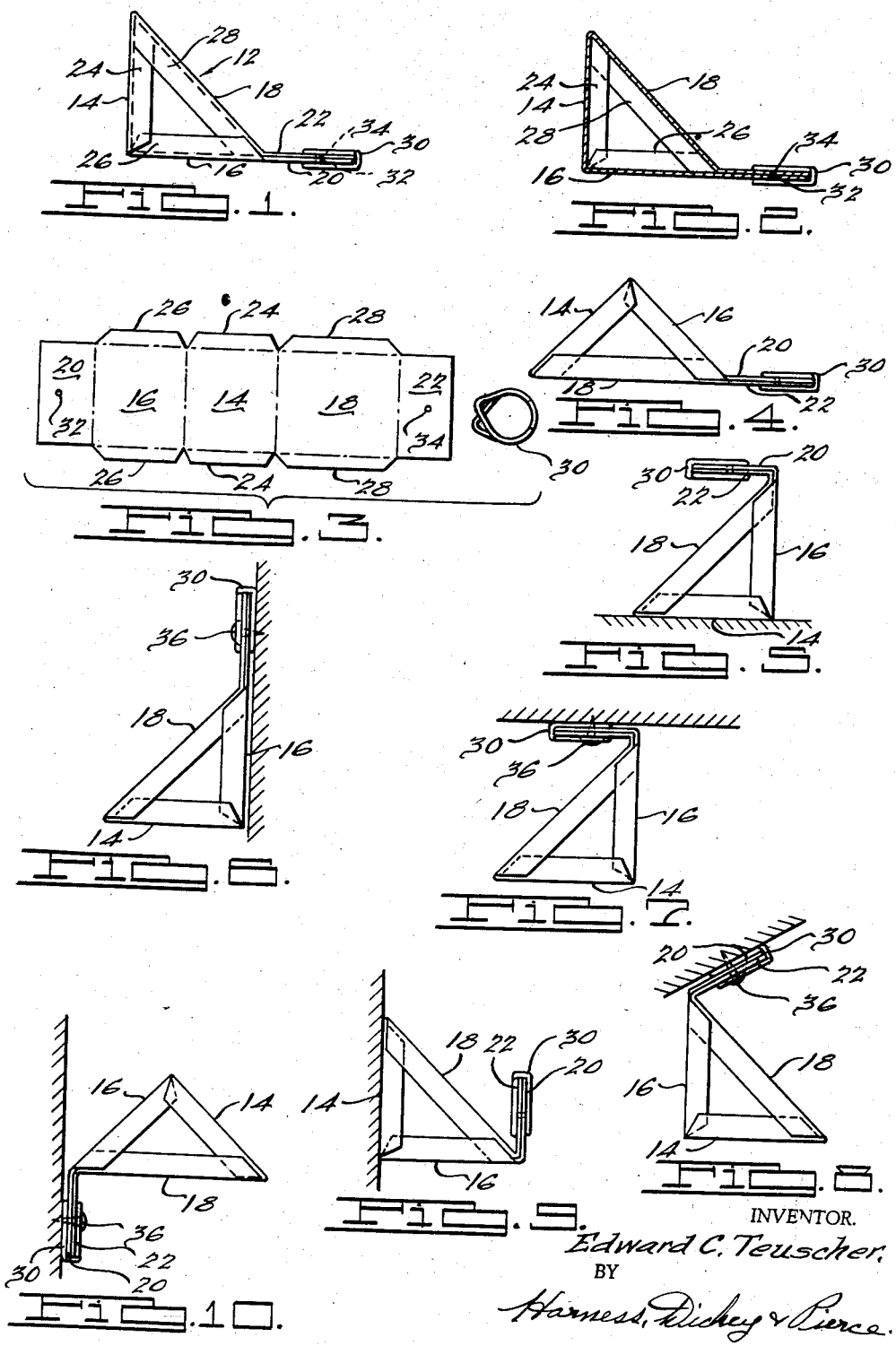

2,869,281

ANT TRAP

Edward C. Teuscher, St. Petersburg, Fla.

Application November 7, 1956, Serial No. 620,934

2 Claims. (Cl. 43—131)

The present invention relates to an improved ant trap and more particularly, to an open trap of the type which is baited with a poison syrup.

It is an object of the present invention to provide an improved ant trap of the above mentioned type which is very simple in design, economical of manufacture, and which may be easily assembled and efficiently used.

It is a primary object of the present invention to provide an improved ant trap particularly adapted for use in killing carpenter ants which may cause extensive damage to wood comparable to that produced by termites.

More specifically, it is an object of the present invention to provide an improved ant trap which is formed of a single sheet of material suitably folded and held in proper folded position by a single clip.

It is another object of the present invention to provide an improved ant trap of the above mentioned type which is peculiarly adapted to be used in a wide variety of positions.

It is a further object of the present invention to provide an improved ant trap of the above mentioned type which has three floor surfaces which may be selectively and successively used and to which the poison syrup bait may be applied.

Other and more detailed objects of the present invention will be appreciated from a consideration of the following specification, the appended claims and the accompanying drawing wherein:

Figure 1 is a side elevational view of an ant trap constructed according to the present invention;

Figure 2 is a sectional view of the structure illustrated in Figure 1;

Figure 3 is a plan view of the blank and clip prior to assembly, showing in broken lines the lines along which the blank is folded in assembling the ant trap;

Figures 4 and 5 illustrate other positions which the ant trap may assume in resting upon a horizontal supporting surface;

Figure 6 shows one position which the ant trap may assume when mounted on a vertical support;

Figure 7 shows the ant trap suspended from the under side of a horizontal support;

Figure 8 shows the ant trap suspended from an inclined support; and,

Figures 9 and 10 show additional positions in which the ant trap may be mounted on a vertical support.

Referring to the drawing, and particularly to Figures 1 to 3, inclusive, thereof, the ant trap 12 is formed of a single sheet of material cut to the shape illustrated in Figure 3 and pre-creased along the broken lines there shown to facilitate folding of the material in the assembly of the ant trap. In the preferred embodiment illustrated, the material employed is a lightweight cardboard material. The blank illustrated in Figure 3 includes a central portion 14, outer portions 16 and 18, and end portions 20 and 22. The central portion 14 and the outer portions 16 and 18 have narrow flanges which extend along the top and bottom of the blank as illustrated in Figure 3, the flanges on the central portion 14 being identified by the reference character 24, and the flanges on the outer portions 16 and 18 being identified by the reference characters 26 and 28, respectively. In assembling the ant trap, the blank is folded along the broken lines illustrated in Figure 3 so that the parts thereof assume the position illustrated in Figure 1. In this position it will be noted that the outer portion 16 is at right angles to the central portion 14 and the other outer portion 18 is folded at an acute angle relative to the central portion 14 so that it meets the remote edge of the outer portion 16, and the two end portions 20 and 22 are disposed as illustrated in Figure 1, with the end portion 22 engaging and overlying, and co-extensive with, the end portion 20.

To complete the assembly, a small metal clip 30 is slipped over the end portions 20 and 22 to the position as illustrated in Figure 1, in which it holds the ant trap assembled in the position illustrated. The end portions 20 and 22 may be provided with aligned apertures 32 and 34 adapted to receive a tack 36 when the ant trap 12 is to be supported in a position other than one in which it rests upon a horizontal supporting surface. Examples of positions in which a tack 36 is used are shown in Figures 6, 7, 8 and 10.

The central portion 14 and the outer portions 16 and 18, when in their assembled positions illustrated in Figures 1 and 2, define the surfaces of a triangular prism and the short flanges 24, 26 and 28 partially, but not completely, close the ends of the prism. The inner surfaces of the central and outer portions 14, 16 and 18 provide three areas upon which the poison syrup may be selectively and successively placed, it being appreciated that the poison syrup bait is placed on only one of these surfaces at a time. It is, of course, placed upon the one of these surfaces which will be disposed horizontally when the ant trap is in the particular position in which it is to be used. By having the flanges 24, 26 and 28 narrow, the ends of the prism are left open permitting the trap to be baited while assembled, by the use of an eye dropper with which the bait liquid may be properly measured. The flanges 24, 26 and 28 prevent the escape of the bait material from the trap.

The end portions 20 and 22 and the clip 30 mounted thereon may be folded as a unit relative to the triangular prism defined by the central and outer portions 14, 16 and 18, so that these end portions 20 and 22 extend at any desired angle from the corner of the prism. The position of the trap illustrated in Figures 1 and 2 illustrates the end portions 20 and 22 in position for use of the trap with bait on the inner surface of the portion 16. In a subsequent use of the trap, when the inner surface of the portion 18 is to support the ant poison, the end portions 20 and 22 may be folded to the positions illustrated in Figure 4. When it is desired to bait the inner surface of the central portion 14, the end portions 20 and 22 should be folded to the position illustrated in Figure 5, in which they will give the trap the most stability.

The position of the support illustrated in Figure 6 may be used in supporting the trap on a tree or on wood joists or the like. As an alternative, the trap may be supported on such objects in the position illustrated in Figure 10.

Figure 9 illustrates that if it is desired to use the third bait supporting surface (the inner surface of portion 16) of the trap when mounting the trap on vertical supports, the central portion 14 may be directly secured to the vertical support as by gluing or the like.

Figures 7 and 8 indicate positions in which the trap may be supported suspended from a supporting joist or limb, which in Figure 7 is illustrated as horizontally disposed, and in Figure 8 is shown inclined.

It will be noted that in Figures 6, 7, 8 and 10, in each of which the ant trap is mounted on the support by a tack 36, the clip 30 is shown in position on the end portions 20 and 22. The clip 30 is preferably left on so that when the tack 36 is removed, the ant trap will be held in assembled position.

In using liquid ant poisons, it is necessary to renew them periodically and it is an important feature of the present applicant's improved ant trap that it provides three surfaces which may be baited selectively and successively, simply by changing the position of use of the trap.

While only one specific embodiment of the invention has been illustrated and described in detail, it will be readily appreciated by those skilled in the art that numerous modifications and changes may be made without departing from the spirit of the present invention.

What is claimed is:

1. An ant trap comprising a single sheet shaped and formed to provide three imperforate triangularly arranged flat inner surfaces arranged as the side surfaces of a three-sided prism, said surfaces being formed with narrow flanges thereon which extend inwardly from each end thereof to partially close the ends of said prism and define openings through which ants may enter said ant trap, said ant trap being selectively disposable in three positions, in each of which a different one of said flat inner surfaces functions as a floor adapted to receive a suitable poison material, and in each of said three positions, two of said narrow flanges being adapted to co-operate to retain said poison material on said floor.

2. An ant trap as defined in claim 1 wherein each of said flanges overlaps and engages two of said flanges so that said flanges hold each other at substantially right angles to said surfaces.

References Cited in the file of this patent

UNITED STATES PATENTS

| | | |
|---|---|---|
| 702,033 | Scott | June 10, 1902 |
| 1,446,450 | Casey | Feb. 27, 1923 |
| 1,765,975 | Haege | June 24, 1930 |